United States Patent [19]

Sylvest

[11] 4,315,392
[45] Feb. 16, 1982

[54] ROOF COVER SHEET MATERIAL

[75] Inventor: Erik Sylvest, Werne a. d. Lippe, Fed. Rep. of Germany

[73] Assignee: Firma Icopal Baustoffe, Werne a.d. Lippe, Fed. Rep. of Germany

[21] Appl. No.: 83,879

[22] Filed: Oct. 11, 1979

[30] Foreign Application Priority Data

Oct. 20, 1978 [DE] Fed. Rep. of Germany ....... 2845700

[51] Int. Cl.³ .............................................. E04B 5/00
[52] U.S. Cl. ..................... 52/309.1; 52/408
[58] Field of Search .................. 52/309.1, 408, 411; 428/284, 286, 287, 304, 282, 285, 354

[56] References Cited

U.S. PATENT DOCUMENTS

| | | | |
|---|---|---|---|
| 3,125,479 | 3/1964 | Finan | 52/408 |
| 3,193,439 | 7/1965 | Price | 428/282 |
| 3,300,927 | 1/1967 | Bettoli | 52/417 |
| 3,691,004 | 9/1972 | Werner | 428/222 |
| 3,746,604 | 7/1973 | Reynolds | 428/311 |
| 4,021,981 | 5/1977 | Wagoner | 52/408 |
| 4,129,097 | 12/1978 | Schwartzkopff | 428/284 |

FOREIGN PATENT DOCUMENTS

| | | | |
|---|---|---|---|
| 1081205 | 5/1960 | Fed. Rep. of Germany | 52/411 |
| 94619 | 8/1969 | France | 52/309.1 |

*Primary Examiner*—Ernest R. Purser
*Assistant Examiner*—Henry E. Raduazo
*Attorney, Agent, or Firm*—Sprung, Felfe, Horn, Lynch & Kramer

[57] ABSTRACT

A roof covering material comprising a sheet material juxtaposed to a spacing means, said spacing means being in the form of a mat of resilient non-woven wires, threads, or fibers, said mat having a high air volume.

10 Claims, 2 Drawing Figures

U.S. Patent      Feb. 16, 1982      4,315,392 ial. This invention also relates to a built-up roof com-
ROOF COVER SHEET MATERIAL

BACKGROUND OF THE INVENTION

1. Field of the Invention

This invention relates to a roof covering sheet material. This invention also relates to a built-up roof comprising sheathing over which is disposed a roof covering sheet material disposed away from the sheathing by a spacing means, the spacing means, in accordance with the invention, being in the form of a mat of resilient non-woven wires, threads, or fibers of high air volume.

2. Discussion of the Prior Art

In the covering of roofs or other surfaces in buildings, especially where damp interiors are involved, a roof cover sheet material is used which is provided on its side facing the sheathing with a means for forming an air space. By the air space produced in this manner between the roof cover sheet material and the sheathing the air and vapor pressure can be equalized, thereby preventing the formation of bubbles under the roll roofing or other roof covering material. At the same time, such spacing means permit movement between the roof cover and the sheathing, thereby preventing the cracking of the roof cover when the sheathing moves as a result of thermal expansion or mechanical stress.

Roll roofing material is known in which uniformly sized stone material serves as the spacing means, especially uniformly sized grains of fire expanded clay. These spacing means have the advantage that the roofing can be put up in rolls without the need to dust the side provided with the spacing means to prevent adhesion when it is rolled, or to insert layers or paper for that purpose. These spacing means, however, have the disadvantage that the roofing cannot be made so as to be sealable by heat, and therefore a binding agent must be provided on the surface of the sheathing to hold the material down. Heated bitumen or asphalt is usually used as such binding agent, being applied spot-wise in sufficient amount to fill up the interstices between the spacing means with such binding agents with such "hold-down spots". Then, however, an unyielding bond is produced between the roofing and the sheathing.

Spacing means of metal or of plastic are also known, which are cemented to the roof cover material with hot bitumen. This, however, has the disadvantage that at the points at which the spacing means are cemented to the sheathing, an unyielding joint between the sheathing and the cover material is produced whereby movement between the two is prevented and the air space is interrupted. Another disadvantage is that, in the known embodiments, the spacing means are so rigid that irregularities on the surface of the sheathing, especially when the sheathing has a very rough surface, show in the top of the roof cover material, or they result in an inadequate bond.

Spacing means of plastic are also known, which can be burned away spot-wise so that direct contact between the cover material and the sheathing is produced, so that cementing with a binding agent, such as bitumen or the like, is possible. This again, however, results in an unyielding bond between the cover material and the sheathing which prevents movement, interrupts the air space, and causes irregularities in the sheathing to become manifest on the upper surface of the cover material.

SUMMARY OF THE INVENTION

It is the object of the invention to provide a spacing means in which all disadvantages of the known spacing means are eliminated and the formation of a continuous air space is ensured.

This object is achieved by the invention by using as the spacing means a unwoven mat of resilient, wires, threads or fibers, having a high volume of air. Such a mat can be laminated together with the roof cover material and can have a thickness up to 30 millimeters, thereby forming an effective ventilation layer and at the same time reducing heat transmission. The mat can be, for example, a random fiber mat of wires or threads of plastic such as polyamide or polyester, but it can also consist of threads of organic material, such as coconut fiber. To enable the mat to have sufficient elasticity and strength, it can consist of plastic wires of a thickness of 0.1 to 0.6 mm. The air interstices between the wires or threads are to be large, so that the solid volume amounts to 1 to 5 percent, e.g., about 2 percent. The mat of plastic wires of bulk weight 20 to 60 kilograms/cubic meter is especially useful. A mat of plastic wires having a bulk weight of 40 kilograms per cubic meter has proven practical. The roof cover material can be any known roll roofing, such as for example a roll roofing consisting of a supporting base on whose both sides a coating of bitumen up to 2 mm thick is provided.

To fasten to the substrate a roll roofing to which such a mat has been laminated, an adhesive can be applied to the surface of the substrate. However, a coating can be applied spot-wise to the side of the mat facing the substrate, which can be, for example, a self-adhesive bitumen coating or a plastic adhesive coating which can be activated by an additional component, so that when the roll roofing is applied to the substrate it will adhere tightly thereto. This coating is applied to the mat only spot-wise, because otherwise a continuous coating would be formed on the substrate, under which air or vapor bubbles might form. Since this coating is applied only spot-wise, such bubbling is prevented.

Regardless of whether the mat is continuously cemented to the substrate or whether its underside is provided spot-wise with a coating which is cemented to the substrate, in all cases a sufficiently large air space is provided between the substrate and the roofing which assures air equalization, the roof cover material remaining tightly affixed to the sheathing through the resilient fibers of the mat, but movements are possible over the entire area between the roof cover material and the substrate. Irregularities in the sheathing are compensated by the mat.

BRIEF DESCRIPTION OF DRAWINGS

Embodiments of the subject matter of the invention are represented in the drawings in which.

DESCRIPTION OF SPECIFIC EMBODIMENTS

Figure 1:
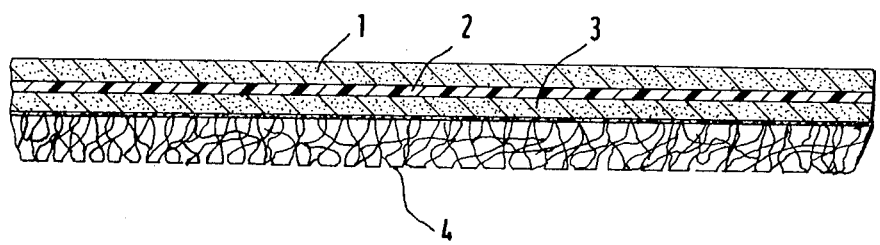
FIGS. 1 and 2 are side sectional views of different embodiments of the roof covering material of this invention.

In FIG. 1, the roof cover material consists of a support 2 on whose both sides are the layers of bitumen 1 and 3 which are up to two millimeters thick. The fiber mat 4 is laminated to the bitumen layer 3.

Figure 2:
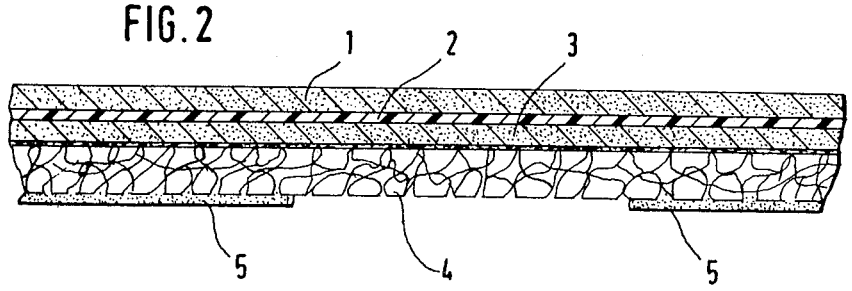

In the embodiment shown in FIG. 2, the roll roofing is built up in the same manner as in the embodiment shown in FIG. 1. Here, again, a fiber mat 4 is laminated to the bitumen layer 3. In addition, cement coatings 5 are applied to the underside of the fiber mat 4, and between them are cement-free gaps.

In accordance with this invention, the fibers can be made of thermoplastic polymers of which, in particular, the following are contemplated: polyethylene, polypropylene, polybutadiene, polyvinylchloride, polyvinylidenechloride, polyvinylidene fluoride, polyvinyl fluoride, polyamide, polyester, rayon, polyacetal, poly(meth)acrylates or other thermoplastic polymer or mixtures thereof.

The fibers can have a staple length of greater than 5 mm and preferably between 5 and 100 mm. They can be disposed on the mat and can be affixed at crossing points of the fibers or the mat can be in the form of a binder-free mat in which the fibers do not adhere to one another at crossing points.

The thickness of the fiber depends upon the amount of fibers per unit area, but generally speaking, in the case of thermoplastic or other organic fibers, the fibers have a thickness between 0.1 and 2.0 mm, preferably between 0.4 and 0.7 mm.

The fibers of the mat have a weight between 0.1 and 0.7 kg, preferably 0.2 to 0.35 kg, per square meter, depending, of course, on the thickness of the fibers, their molecular weight, and their length. Generally, the fibers of the mat are so disposed such as to impart to the mat a void volume of between 95 and 99 per square meter. The thickness of the mat itself is generally 6 to 20 mm, preferably 9 to 12 mm.

What is claimed is:

1. A roof comprising a substrate over which is disposed roof covering sheet material, between said roof covering sheet material and said substrate there being disposed a spacing means, said spacing means being in the form of a nonwoven mat of resilient wires, thread, or fibers having an air volume exceeding 95%, said air volume being sufficient to effect air equalization, said nonwoven mat having a thickness of at least 6 mm.

2. A roof according to claim 4 wherein said mat consists essentially of wires or threads of plastic and/or of organic material.

3. A roof according to claim 2 wherein said mat consists essentially of wires of plastic of thickness 0.1 to 0.6 mm.

4. A roof according to claim 1, wherein said roof covering material consists essentially of a support on whose both sides are layers of bitumen which are up to 2 mm thick and said nonwoven mat of resilient wires, threads or fibers is laminated to one of said layers of bitumen.

5. A roof according to claim 4, wherein the side of said nonwoven mat which is not laminated to said layer of bitumen is cemented to a substrate disposed therebelow.

6. A roof according to claim 1, wherein on the side of said mat facing said substrate and disposed away from said roof covering sheet material a coating is disposed spotwise.

7. A roof according to claim 1, wherein the solid volume of said mat is 1 to 5 percent.

8. A roof according to claim 7, wherein said nonwoven mat comprises plastic wires of bulk weight 20 to 60 kilograms per cubic meter.

9. A roof according to claim 1 wherein said nonwoven mat has a thickness up to 30 mm.

10. A roof according to claim 11 whose mat thickness is up to 20 mm.

* * * * *

UNITED STATES PATENT AND TRADEMARK OFFICE
CERTIFICATE OF CORRECTION

PATENT NO. : 4,315,392
DATED : Feb. 16, 1982
INVENTOR(S) : Erik Sylvest

It is certified that error appears in the above—identified patent and that said Letters Patent is hereby corrected as shown below:

Column 4, line 5, Delete "4" and insert --1--.

Signed and Sealed this

Seventeenth Day of August 1982

[SEAL]

Attest:

GERALD J. MOSSINGHOFF

Attesting Officer  Commissioner of Patents and Trademarks